(12) United States Patent
Faxér et al.

(10) Patent No.: US 10,616,908 B2
(45) Date of Patent: Apr. 7, 2020

(54) MU-MIMO COMMUNICATION IN SYSTEMS WITH ANTENNA SUBARRAYS

(71) Applicant: Telefonaktiebolaget LM Ericsson (publ), Stockholm (SE)

(72) Inventors: Sebastian Faxér, Järfälla (SE); Fredrik Athley, Kullavik (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 451 days.

(21) Appl. No.: 15/324,606

(22) PCT Filed: Sep. 13, 2016

(86) PCT No.: PCT/SE2016/050849
§ 371 (c)(1),
(2) Date: Jan. 6, 2017

(87) PCT Pub. No.: WO2018/052344
PCT Pub. Date: Mar. 22, 2018

(65) Prior Publication Data
US 2018/0184441 A1   Jun. 28, 2018

(51) Int. Cl.
*H04W 72/12* (2009.01)
*H04B 7/0452* (2017.01)
(Continued)

(52) U.S. Cl.
CPC ...... *H04W 72/1226* (2013.01); *H04B 7/0452* (2013.01); *H04B 7/0456* (2013.01);
(Continued)

(58) Field of Classification Search
CPC ......... H04W 72/1205; H04W 72/1226; H04W 72/1263; H04W 74/002; H04B 7/0452;
(Continued)

(56) References Cited

U.S. PATENT DOCUMENTS

| 2012/0196545 | A1 | 8/2012 | Schmidt et al. |
| 2013/0083743 | A1* | 4/2013 | Koo ..................... H04B 7/0456 370/329 |
| 2014/0050280 | A1 | 2/2014 | Stirling-Gallacher et al. |

(Continued)

FOREIGN PATENT DOCUMENTS

| EP | 2775563 A1 * | 9/2014 | ............. H01Q 1/246 |
| WO | 2007/023371 A1 | 3/2007 | |

OTHER PUBLICATIONS

International Search Report and Written Opinion dated May 19, 2017 for International Application Serial No. PCT/SE2016/050849, International Filing Date: Sep. 13, 2016 consisting of 18-pages.
(Continued)

*Primary Examiner* — Kibrom T Hailu
(74) *Attorney, Agent, or Firm* — Christopher & Weisberg, P.A.

(57) ABSTRACT

A network entity and method for co-scheduling receivers in a multi-user, multiple-input multiple-output communication system of the kind that uses antenna subarrays are described. In a method implementation candidate precoder matrix indicators are received. Interference estimates are computed relating to the interference caused by the transmission signal to one receiver on the transmission signal(s) to the other receiver(s). On that basis, a co-scheduling combination is chosen which is predicted to provide an adequately low interference based on these interference estimates. The interference estimate calculation includes at least one parameter specific to the antenna subarrays of the transmitting antenna array.

21 Claims, 8 Drawing Sheets

(51) Int. Cl.
*H04B 7/0456* (2017.01)
*H04L 5/00* (2006.01)
*H04B 7/06* (2006.01)

(52) U.S. Cl.
CPC ......... *H04B 7/0469* (2013.01); *H04L 5/0048* (2013.01); *H04B 7/0691* (2013.01)

(58) Field of Classification Search
CPC .. H04B 7/0456; H04B 7/0469; H04B 7/0691; H04L 5/0048
See application file for complete search history.

(56) References Cited

U.S. PATENT DOCUMENTS

| | | | |
|---|---|---|---|
| 2014/0177745 A1 | 6/2014 | Krishnamurthy et al. | |
| 2014/0254517 A1* | 9/2014 | Nam | H04B 7/0417 370/329 |
| 2015/0236772 A1* | 8/2015 | Hammarwall | H04B 7/0617 370/329 |
| 2015/0326299 A1 | 11/2015 | Petersson et al. | |
| 2016/0135180 A1* | 5/2016 | Yuan | H04B 7/0617 370/329 |
| 2016/0149680 A1* | 5/2016 | Kang | H04B 7/0417 370/329 |
| 2016/0359596 A1* | 12/2016 | Wild | H04B 7/0695 |
| 2017/0324433 A1* | 11/2017 | Byun | H04B 17/00 |

OTHER PUBLICATIONS

Hyoungju Ji et al., Title: Overview of Full-Dimension MIMO in LTE-Anvanced Pro, Aug. 8, 2016 consisting of 19-pages.
Communication Pursuant to Article 94(3) EPC dated Jul. 12, 2019 and issued in corresponding European Application No. 16 770 584.7, consisting of 12 pages.

* cited by examiner

MU-MIMO COMMUNICATION IN SYSTEMS WITH ANTENNA SUBARRAYS

CROSS-REFERENCE TO RELATED APPLICATIONS

This application is a Submission Under 35 U.S.C. § 371 for U.S. National Stage Patent Application of International Application Number: PCT/SE2016/050849, filed Sep. 13, 2016 entitled "MU-MIMO COMMUNICATION IN SYSTEMS WITH ANTENNA SUBARRAYS," the entirety of which is incorporated herein by reference.

TECHNICAL FIELD

The present disclosure generally relates to multi-user (MU) multiple-input multiple-output (MIMO) communication and in particular to co-scheduling and link adaptation in MU-MIMO systems employing antenna subarrays.

BACKGROUND

MIMO is a multi-antenna technique that uses multiple antennas at the transmitter and receiver to perform spatial multiplexing. Multi-antenna techniques can significantly increase the data rates and reliability of a wireless communication system. The performance is in particular improved if both the transmitter and the receiver are equipped with multiple antennas, which results in a MIMO communication channel. Such systems and/or related techniques are commonly referred to as MIMO.

The LTE standard is currently evolving with enhanced MIMO support. A core component in LTE is the support of MIMO antenna deployments and MIMO related techniques. Currently LTE-Advanced supports an 8-layer spatial multiplexing mode for 8 transmission antennas with channel-dependent precoding. The spatial multiplexing mode is aimed at high data rates in favorable channel conditions.

FIG. 1 is an illustration of the spatial multiplexing operation of a MIMO-OFDM transmitter TX 10 with $N_T$ antenna ports 12. An input data stream is separated by a serial-to-parallel converter S/P 14 into its r transmission layers 16. The transmission layer data streams are then coded in a coding unit 18 by multiplying an information carrying symbol vector s by an $N_T \times r$ precoder matrix W, which serves to distribute the transmit energy into a subspace of the $N_T$-dimensional vector space corresponding to the $N_T$ antenna ports. Each transmission layer is precoded with precoder matrix W and then each data stream is passed through an OFDM modulator 20 which performs an IFFT on the r-length blocks. The signals are then sent to each of the $N_T$ antennas and transmitted. The r symbols in symbol vector s each correspond to a layer and r is referred to as the transmission rank. In this way, spatial multiplexing is achieved with multiple symbols being transmitted simultaneously over the same time/frequency resource element (TFRE). The number of symbols r is typically adapted to suit the current channel properties.

It is conventional that the precoder matrix W is selected from a codebook of possible precoder matrices, and typically indicated by means of a PMI, which specifies a unique precoder matrix in the codebook for a given number of symbol streams. Restriction of the precoder to selection from a codebook is a practical measure to make the amount of computation practical. An ab initio computation of a suitable precoder matrix would take too much processing power.

LTE uses OFDM in the downlink (and DFT precoded OFDM in the uplink). The received $N_R \times 1$ vector $y_n$ for a certain TFRE on subcarrier n (or alternatively data TFRE number n) is modeled by:

$$y_n = H_n W s_n + e_n \quad (1)$$

where $e_n$ is a noise/interference vector obtained as realizations of a random process. The precoder W can be a wideband precoder, which is constant over frequency, or a frequency selective precoder.

The precoder matrix W is often chosen to match the characteristics of the $N_R \times N_T$ MIMO channel matrix $H_n$, resulting in so-called channel dependent precoding. This is also commonly referred to as closed-loop precoding and essentially aims to focus the transmit energy into a subspace which is strong in the sense of conveying a large proportion of the transmitted energy to the UE. In addition, the precoder matrix may also be selected with the aim of orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \|\hat{H}_n W_k\|_F^2 \quad (2)$$

where
  $\hat{H}_n$ is a channel estimate, possibly derived from CSI-RS as described below.
  $W_k$ is a hypothesized precoder matrix with index k.
  $\hat{H}_n W_k$ is the hypothesized equivalent channel.

In closed-loop precoding for the LTE downlink, the UE transmits, based on channel measurements in the forward link (i.e. DL), recommendations to the eNodeB of a suitable precoder to use. The eNodeB configures the UE to provide feedback according to the UEs transmission mode, and may transmit CSI-RS and configure the UE to use measurements of CSI-RS to feed back recommended precoding matrices that the UE selects from a codebook. A single precoder that is designed to cover a large band-width (wideband precoding) may be fed back. It may also be beneficial to match the frequency variations of the channel and instead feed back a frequency-selective precoding report, e.g. a report recommending several different precoders, one per subband. This is an example of the more general case of CSI feedback, which also encompasses feeding back other information in addition to precoder recommendations in order to assist the eNodeB in subsequent transmissions to the UE. Such other information may include channel quality indicators (CQIs) as well as a transmission rank indicator (RI).

Based on the CSI feedback from the UE, the eNodeB determines the transmission parameters it wishes to use for transmission to the UE, including the precoding matrix, transmission rank, and modulation and coding state (MCS). Although the transmission parameters determined by the eNodeB take account of the recommendations made by the UE, they may differ from the recommendations taking account of other factors. Therefore, a rank indicator and MCS may be signaled in downlink control information (DCI), and the precoding matrix can be signaled in DCI or the eNodeB can transmit a de-modulation reference signal from which the equivalent channel can be measured. The transmission rank, and thus the number of spatially multiplexed layers, is reflected in the number of columns of the precoder W. For efficient performance, it is important to select a transmission rank which matches the channel properties.

A common type of precoding is to use a DFT-precoder, where the precoder vector used to precode a single-layer transmission using a single-polarized uniform linear array (ULA) with N antennas is defined as $$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix},$$

where k=0, 1, (QN−1) is the precoder index and Q is an integer oversampling factor. A corresponding precoder vector for a two-dimensional uniform planar array (UPA) can be created by taking the Kronecker product of two precoder vectors as $$w_{2D}(k,l) = w_{1D}(k) \otimes w_{1D}(l).$$

Extending the precoder for a dual-polarized UPA may then be done as $$w_{2D,DP}(k, l, \phi) = \begin{bmatrix} 1 \\ e^{j\phi} \end{bmatrix} \otimes$$

$$w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix}$$

where $e^{j\phi}$ is a co-phasing factor that may for instance be selected from the QPSK alphabet:

$$\phi \in \left\{ 0, \frac{\pi}{2}, \pi, \frac{3\pi}{2} \right\}$$

A precoder matrix $W_{2D,DP}$ for multi-layer transmission may be created by appending columns of DFT precoder vectors as $$W_{2D,DP} = [w_{2D,DP}(k_1, l_1, \phi_1) w_{2D,DP}(k_2, l_2, \phi_2) \ldots w_{2D,DP}(k_R, l_R, \phi_R)]$$

where R is the number of transmission layers, i.e. the transmission rank. In a common special case for a rank-2 DFT precoder, $k_1 = k_2 = k$ and $l_1 = l_2 = l$, meaning that $$W_{2D,DP} = [w_{2D,DP}(k, l, \phi_1) \; w_{2D,DP}(k, l, \phi_2)] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.$$

With multi-user MIMO, two or more users in the same cell are co-scheduled on the same time-frequency resource. That is, two or more independent data streams are transmitted to different UEs at the same time, and the spatial domain is used to separate the respective streams. By transmitting several streams simultaneously, the capacity of the system can be increased. This however, comes at the cost of reducing the signal-to-interference-plus-noise power ratio (SINR) per stream, as the power has to be shared between streams and the streams will to some extent interfere with each other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed users.

Accurate CSI is required in order to perform appropriate null-forming between co-scheduled users. In the current LTE Release 13 standard, no special CSI feedback mode for MU-MIMO exists and thus, feedback-based MU-MIMO scheduling and precoder construction has to be based on the existing CSI reporting designed for single-user MIMO (i.e. a PMI indicating a DFT-based precoder, a transmission RI and a CQI). Thus, pairing of users for MU-MIMO and the corresponding link adaptation has to be based on the reported PMI and may for example be derived by calculating the orthogonality of the reported precoders for each user.

The present disclosure is specific to the situation in which an antenna array is subdivided into a plurality of subarrays, wherein each subarray is supplied with a common signal. That is, instead of feeding separate signals to each physical antenna subelement, a plurality of subelements are virtualized together into a subarray, so as to form a virtual antenna element. Each such virtual antenna element, i.e. subarray, is then fed a separate signal.

Dividing an antenna array into subarrays is beneficial so as to reduce the number transmit receive units (TXRUs), which in turn reduces cost. Another purpose is to beamform the antenna ports over which reference signals that define a cell are transmitted; this provides some control of the intercell interference in the network. A yet further example that is frequently used in cellular networks is to use electrical downtilt in the subarrays in order to reduce the interference to adjacent sites.

FIG. 2A shows a standard antenna array 15 which is the aggregate of the individual antennas 12, wherein each antenna is supplied with its own independent signal.

FIG. 2B shows an antenna array 15 which is split into subarrays 25, namely four subarrays consisting of two dual-polarized antennas (or four antenna subelements, two per polarization) each. Each subarray 25 is supplied with a common signal per polarization, i.e. the antennas with the same polarization in any given subarray all receive the same signal. The signal fed to each polarization of a subarray is then mapped onto each constituent antenna subelement with the same polarization of the subarray by some linear function, for instance by applying different phase shifts of the signal to each subelement. For brevity, in the rest of this disclosure, a subarray may refer to one polarization of a subarray, that is fed a single signal.

FIG. 3 shows an example of signal mapping to a subarray of pairs of antennas in which, for each polarization, a phase shift of α is applied to the lower antenna subelement of each antenna pair. This mapping may be described by a matrix multiplication by a $N_{ant} \times N_{virt}$ matrix $G_{virt}$. In the illustrated example $$G_{virt} = I_8 \otimes \begin{bmatrix} 1 \\ e^{-j\alpha} \end{bmatrix}$$

where $I_8$ is a size 8×8 identity matrix, so that $x=G_{virt}y$ where x and y are the signals mapped to the antenna subelements and subarrays, respectively.

The antenna ports described herein are assumed to be defined by reference signals transmitted on the subarrays.

When subarrays are employed, existing methods for pairing of users for MU-MIMO have the short-coming that they rely on determining the orthogonality of the co-scheduling candidates among reported precoders. This may lead to suboptimal link adaptation and to suboptimal user pairing when subarrays are used, as neither the subarray radiation pattern, nor the presence of grating lobes are taken into account. Grating lobes arise if the condition $d≥λ/2$ is met, where λ is the carrier wavelength, which is often the case when subarrays are provided. Grating lobes may be considered to be analogous to aliasing as a result of undersampling and mean that there are multiple candidate directions for the transmission direction (or bearing), only one of which is correct.

SUMMARY

An object of the present disclosure is to improve MU-MIMO co-scheduling decisions (i.e. user pairing) for transmitter arrangements employing antenna arrays consisting of subarrays, as well as improving the corresponding link adaptation.

According to a first aspect there is provided a method for a network entity to make decisions on co-scheduling of receivers in a multi-user, multiple-input multiple-output communication system, which comprises a transmitter and multiple receivers, wherein the transmitter is provided with an antenna array made up of multiple antenna subarrays, each having a plurality of antenna subelements, the method comprising receiving candidate precoder matrix indicators for each of the receivers which are to receive respective transmission signals; calculating interference estimates of interference caused by the transmission signal to one receiver on the transmission signal(s) to the other receiver(s) using the candidate precoder matrices specified in the precoder matrix indicators and at least one parameter specific to the antenna subarrays of the transmitting antenna array; and deciding on a co-scheduling combination between at least two receivers based on the interference estimates.

The decision on how to co-schedule the receivers may be applied to carry out a transmission with this co-scheduling combination. It is noted that the MU-MIMO communication system may comprise further receivers than those participating in the method outlined above.

According to a second aspect there is provided a network entity responsible for making decisions on co-scheduling receivers in a multi-user, multiple-input multiple-output communication system, which comprises a transmitter and multiple receivers, wherein the transmitter is provided with an antenna array made up of multiple antenna subarrays, each having a plurality of antenna subelements, the network entity comprising an input operable to receive candidate precoder matrix indicators for each of the receivers which are to receive respective transmission signals; and a processor operable to calculate interference estimates of interference caused by the transmission signal to one receiver on the transmission signal(s) to the other receiver(s) using the candidate precoder matrices specified in the precoder matrix indicators and at least one parameter specific to the antenna subarrays of the transmitting antenna array and to decide on a co-scheduling combination based on the interference estimates.

According to a third aspect there is provided a multi-user, multiple-input multiple-output communication system, such as one conforming to LTE-Advanced, comprising: a transmitter with an antenna array made up of multiple antenna subarrays; multiple receivers with respective receiver antennas; and a network entity responsible for making decisions on co-scheduling the receivers according to the second aspect.

According to a fourth aspect there is provided a computer program stored on a computer readable medium and loadable into the internal memory of a network entity, comprising software code portions for performing the method of the first aspect of the present disclosure when said program is run on said network entity.

According to a fifth aspect there is provided a computer program product storing the computer program of the fourth aspect.

A co-scheduling combination may be decided upon that provides an adequately low interference based on the interference estimates, for example a combination which has a predicted level of interference (e.g. in terms of a SINR) below a threshold that is known to be acceptable. Another example would be to calculate all possible combinations, or at least a significant proportion of possible combinations, and choose the one with the lowest predicted interference.

To estimate the interference, a variety of parameters may be relied upon, either singly or in combination. There may be a particular signal mapping, such as a linear function, to transform a signal inputted to each subarray into signals for each antenna subelement in that subarray. As noted in previous sections of the present disclosure, a subarray is typically supplied with a common signal, which is to be transformed into signals feeding the respective antenna subelements. One or more parameters relating to this signal mapping can then be used for calculating the interference estimates. For example, phase shifts can be applied to the signal inputted to the subarray, so that each antenna subelement receives a differently phase-shifted version of the inputted signal (wherein the inputted signal may or may not undergo further processing specific to an antenna subelement or a group of antenna subelements), and a parameter can be chosen which relates to the phase shifts, e.g. a fixed phase shift increment applied to each subarray element, e.g. 90 degrees in the case that there are 4 subarray elements supplied with phase-shifted versions of the common signal at offsets of: 0, 90, 180, and 270 degrees. The subarrays will be separated from each other by a distance, and this distance may be included as one of the parameters to the interference estimation.

As a prompter to receive the candidate precoder matrix indicators, the method may be initiated by transmitting respective reference signals to the receivers, each having a phase center separation greater than half a wavelength, the candidate precoder matrix indicators determined by the receivers and sent back to the transmitter as candidates are then determined by the receivers based on these reference signals. In particular, the phase center separation may be significantly greater than half a wavelength, such as at least one wavelength. Such a geometry may produce interference phenomena separate or different from those arising from the superposition of electromagnetic waves emitted by individual antenna subelements, which are arranged significantly closer to one another.

In some cases, the interference estimate calculation may result in multiple possible candidate transmission directions. To resolve these ambiguities, the estimate calculation is extended to further include determining which of the candidate transmission directions is the one most likely to be correct based on the one most likely to provide a lower interference.

A variety of methods may be used to make this determination to resolve the ambiguities either singly or in combination. An exemplary method includes using a measurement of another carrier which is available for communication between the transmitter and the receivers; using an uplink measurement of traffic sent to the transmitter from the receivers; in the case that at least some of the receivers each send multiple candidate precoder matrix indicators, comparing strength of the multiple candidate precoder matrix indicators; comparing channel quality indicator values for the precoder matrix indicator of highest strength and next highest strength; using geographical position information of at least one of: the transmitter and the receivers; using known information relating to transmitter antenna array deployment; and using measurements from other antennas located adjacent to the transmitter antenna array.

It is noted that typically, but not necessarily, the candidate precoder matrix indicators will be received from the network entities hosting the respective receiver antennas, e.g. the UEs.

BRIEF DESCRIPTION OF THE DRAWINGS

The embodiments of the technique presented herein are described herein below with reference to the accompanying drawings.

DETAILED DESCRIPTION

Figure 1:
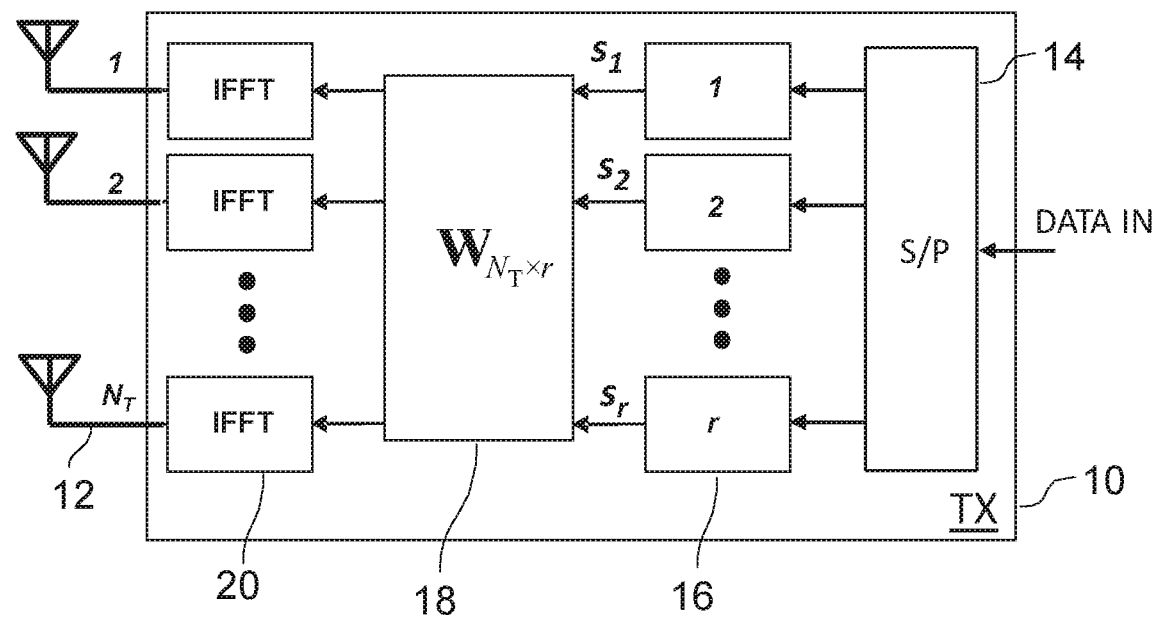
FIG. 1 shows transmission structure of precoded spatial multiplexing mode in LTE.

In the following description, for purposes of explanation and not limitation, specific details are set forth (such as particular method steps) in order to provide a thorough understanding of the technique presented herein. It will be apparent to one skilled in the art that the present technique may be practiced in other embodiments that depart from these specific details. For example, while the following embodiments will be described with reference to 5G and also 4G networks, it will be appreciated that the technique presented herein is not limited to any type of cellular network access.

Those skilled in the art will further appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

It is noted that one-dimensional antenna arrays and subarrays are used in the specific examples described in this disclosure to explain the principles of the present disclosure, but the present disclosure is also applicable to two-dimensional antenna arrays and/or two-dimensional subarrays. In this case, the radiation pattern is a function of two angles.

It is further noted that references to 'user pairing' follow usual convention in the art and apply to multiple combinations of two, three or more users, not just to a combination between only two users.

It is still further noted that this document principally refers to OFDM-MIMO in its specific examples, but the principles of the present disclosure are applicable to other transmission protocols than OFDM.

It is also noted that, although the embodiments show that the decision making on co-scheduling is made in the eNodeB, which is a specific example of the decision making being made in the network entity which is acting as the MU-MIMO transmitter, in principle the processing needed for the decision making could be carried out at any location in the network, and the results transmitted to the transmitter network entity. However, this would generally be less efficient in view of the additional communication overhead.

Certain terms used in the following detailed description of exemplary embodiments are defined as follows: "4G" is the fourth generation of mobile telecommunications technology as defined by the ITU in IMT Advanced, such as LTE including LTE-Advanced. "5G" is the fifth generation of mobile telecommunications and wireless technology which is not yet fully defined, but in an advanced draft stage, e.g. in 3GPP TS 23.401 version 13.6.1 Release 13 of May 2016.

The sequence diagram and the following supporting description use a number of acronyms, the meaning of which is as follows:

| Acronym | Description |
| --- | --- |
| 3GPP | Third Generation Partnership Project |
| CQI | Channel Quality Indicator |
| CSI | Channel State Information |
| CSI-IM | CSI Interference Measurement |
| CSI-RS | CSI Reference Signal |
| DCI | Downlink Control Information |
| DFT | Discrete Fourier Transform |
| DL | Downlink |
| eNB | evolved Node-B or eNodeB |
| FFT | Fast Fourier Transform |
| I/O | input/output |
| IFFT | Inverse FFT |
| IP | Internet Protocol |
| LTE | Long-Term Evolution |
| MCS | Modulation and Coding Scheme |
| MIMO | multiple-input multiple-output |
| MU | multi-user |
| OFDM | Orthogonal Frequency Division Multiplexing |
| PMI | Precoder Matrix Indicator |
| RAT | Radio Access Technology |
| RI | Rank Indicator |
| RS | Reference Signal |
| RSRP | RS Received Power |
| SINR | Signal to Interference plus Noise power Ratio |
| TFRE | time/frequency resource element |
| TXRU | Transmit Receive Unit |
| UE | User Equipment |
| UL | Uplink |
| ULA | Uniform Linear Array |
| UPA | Uniform Planar Array |

In some variants, the proposed embodiments enable better MU-MIMO co-scheduling decisions to be made and/or making less link adaptation errors in a system employing antenna subarrays. These and other improvements are in some implementations achieved by taking into account at least one of the antenna subarray radiation pattern and grating lobe positions during the calculation of simulated antenna radiation patterns done in the course of deciding on a suitable co-scheduling combination.

With better MU-MIMO co-scheduling and link adaptation decisions, it is possible to deliver improved system performance, since the eNB antenna subarray structure may be taken into account in the selection of the precoder matrices to use for the transmission to paired UEs or other paired network entities.

By taking into account the subarray virtualization matrix, a better estimate of the crosstalk between the co-scheduled users may be calculated, thus improving the link adaptation.

The utility and benefit which embodiments of the present disclosure are able to provide will now be illustrated through comparative examples.

Consider the scenario in which an eNodeB employing an antenna array consisting of subarrays needs to decide whether (or not) to co-schedule two UEs, UE_A and UE_B, in an MU-MIMO transmission. It is recalled that while the term eNodeB is established in 4G technology, it is used in the present disclosure in a forward-looking sense, so as to also include its functional equivalents or approximate equivalents in 5G technology and deployments compliant therewith. This applies correspondingly to other elements of 4G technology which will be inherited by 5G under yet not specified names.

The eNodeB is in possession of recommendations of a suitable precoder to use from the reports it has received from UE_A and UE_B. We refer to the reported, i.e. recommended, precoders as $W_A$ and $W_B$ for UE_A and UE_B respectively.

In the prior art, the standard approach would be to make such a pairing decision by calculating a precoder orthogonality factor, e.g. $\|W_A^H W_B\|^2$. However, as the reported precoders only indicate a de-sired transmission from the CSI-RS antenna ports and not the entire antenna array, such a pairing decision may be suboptimal. Further, even if the two precoders are completely orthogonal, the resulting MU-MIMO transmission may still cause significant crosstalk between the users if their channels have some amount of spatial spread, as this is not captured in the precoder information. An alternative prior art approach is to make user pairing decisions based on the distance between the main lobes of the reported precoders, so as only to allow users to pair if they have sufficiently well-separated main lobes.

Figure 4:
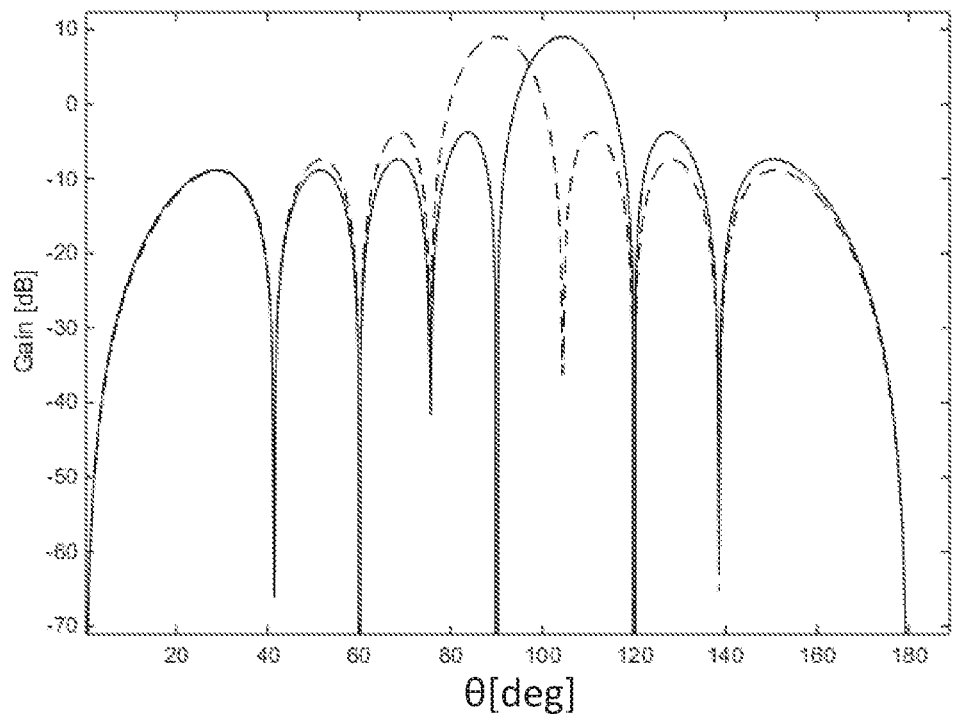
FIG. 4 illustrates precoder radiation patterns according to a prior art approach without taking into account subarray spacing and radiation pattern.

FIG. 4 illustrates precoder radiation patterns calculated according to such prior art approaches with a λ/2 (i.e., half a wavelength) port separation being assumed. The illustrated precoders are in this example completely orthogonal, so if the orthogonality factor were used as the pairing criterion, then a decision to pair the two UEs would be made. On the other hand, in this example, the distance between the main lobes is quite small, so if the main lobe distance criterion were used to decide on user pairing, then the decision may have been not to pair the UEs for MU-MIMO transmission.

We now consider the effect of having subarrays. One consequence of having subarrays is that the distance between adjacent antenna ports will be larger, since this is now the distance between adjacent subarrays rather than between individual antennas. This distance will therefore generally be larger than half the wavelength of the carrier frequency, and so, the larger antenna port spacing (rather than the presence of the subarrays themselves) will introduce grating lobes in the transmitted radiation patterns.

Figure 5:
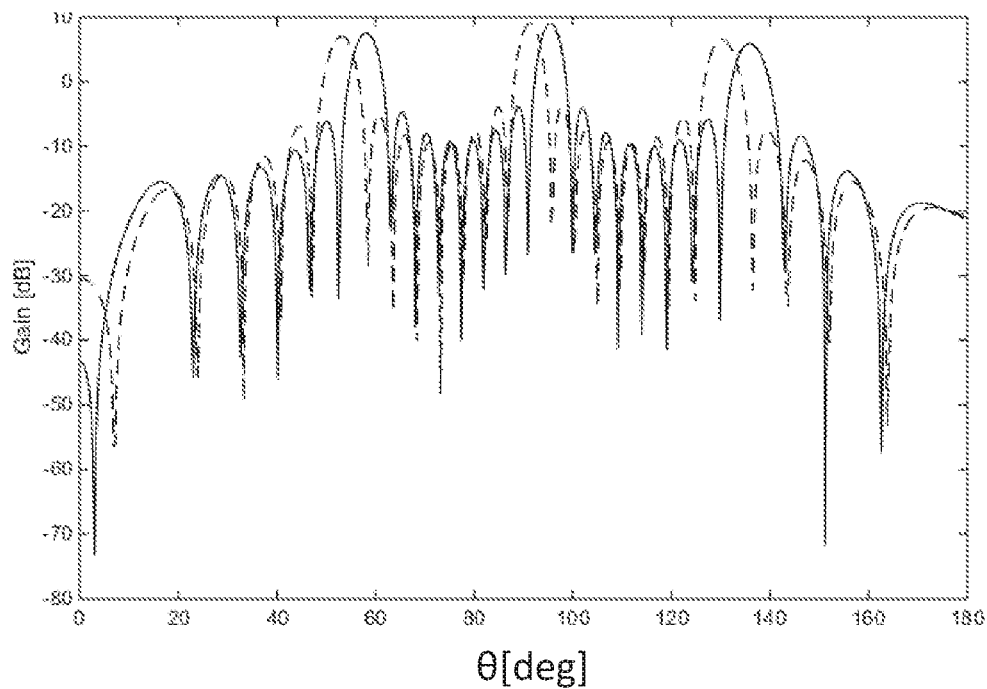
FIG. 5 illustrates precoder radiation patterns taking the antenna port spacing into account, but without taking the subarray radiation pattern into account (but with the physical antenna subelement pattern taken into account).

FIG. 5 illustrates precoder radiation patterns taking the increased antenna port spacing needed to accommodate subarrays into account, but without taking the subarray radiation patterns into account. That is, (only) the changed physical antenna subelement pattern that follows from using antenna subarrays is taken into account. However, in this example, the changed antenna port radiation pattern that follows from using antenna subarrays is not taken into account.

Instead of a clearly identifiable single main lobe, the radiation patterns are more complex and have multiple, similarly prominent grating lobes. Because of this ambiguity regarding which lobe is the primary one, the pairing decision making entity, i.e. the eNodeB in our example, will not know which one of the multiple, similarly prominent grating lobes the UEs are actually located in. If the subarray radiation patterns had been isotropic, this knowledge would not have mattered, since the grating lobes would just have been identical copies of each other, as is illustrated in FIG. 5. However, if the subarray pattern is not isotropic (and for instance is designed to form a null towards neighboring cells) this knowledge will be useful.

Figure 6:
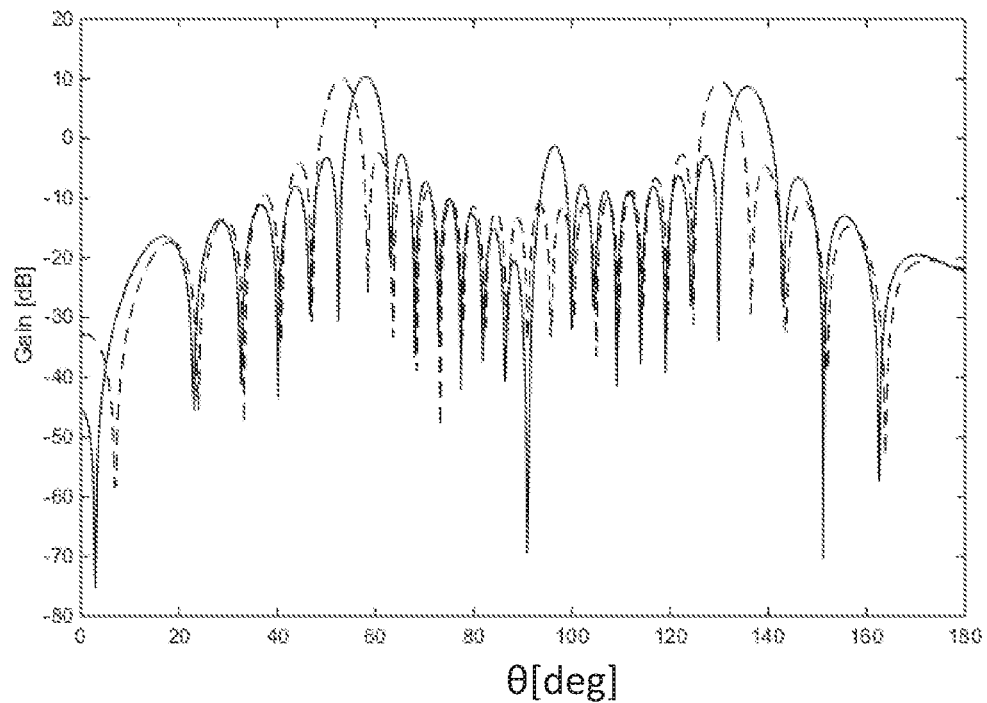
FIG. 6 illustrates precoder radiation patterns taking subarray radiation pattern into account. The middle grating lobe of the precoder corresponding to the dotted line is attenuated by the subarray radiation pattern.

FIG. 6 illustrates this point by showing precoder radiation patterns which take account of the subarray radiation pattern (as well as the larger antenna port spacing). As can be seen, the effect of the subarray radiation pattern is to strongly attenuate the middle one of the prominent grating lobes (i.e. the one at zenith angle of about 95°) of the precoder for UE_A (see dotted line). There is no similar attenuation of the adjacent grating lobe of the precoder for UE_B (see solid line).

Figure 7:
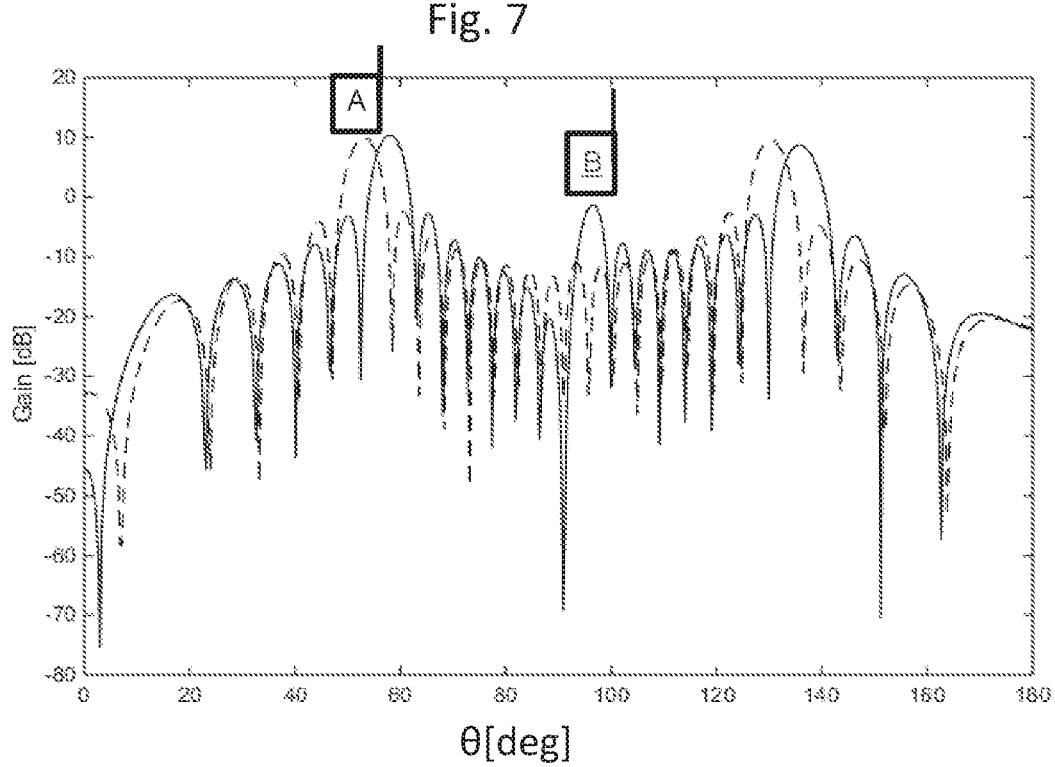
FIG. 7 shows how co-scheduling UE_A with UE_B may cause low interference to UE_B.
Figure 8:
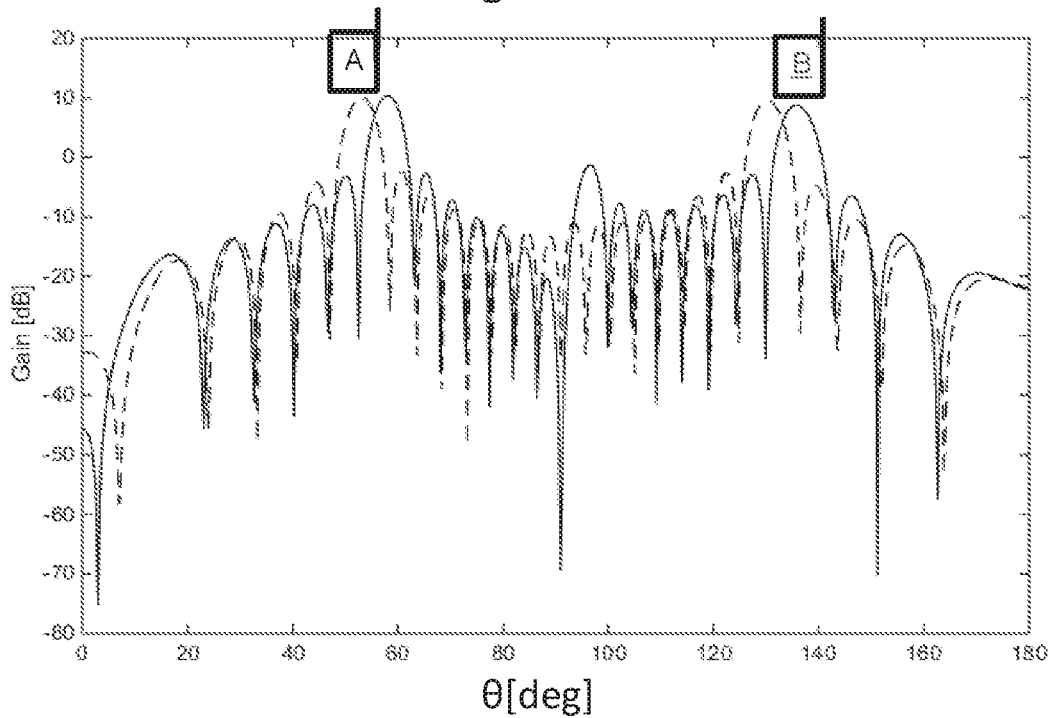
FIG. 8 shows how co-scheduling UE_A with UE_B may cause high interference to UE_B.

FIG. 7 and FIG. 8 reproduce the same precoder radiation patterns as FIG. 6 and additionally insert schematics of UE_A and UE_B to show possible zenith angles. In both FIG. 7 and FIG. 8, UE_A is arranged at its grating lobe peak with zenith angle of about 50°. Regarding a possible pairing with UE_B, if UE_B is located in its middle grating lobe at zenith angle of about 95° as schematically illustrated by the outline mobile device B in FIG. 7, the crosstalk from UE_A can be expected to be small, so that a decision to pair UE_A and UE_B for MU-MIMO transmission may be expected to be a sensible one. However, with reference to FIG. 8, if a decision were taken to locate UE_B at the grating lobe with zenith angle of about 135°, as schematically illustrated by the outline mobile device B, the expected crosstalk from UE_A would be large, so that it would not be sensible to co-schedule, i.e. to pair, UE_A and UE_B. (It is also noted that high cross-talk would also be expected, if UE_B were arranged at the other principal grating lobe with zenith angle of about 60°; then a pairing would also not be meaningful.)

An embodiment of the method is now described. The method may be implemented in hardware, software, firmware or other programmable or configurable logic elements hosted by a network node tasked with making user pairing decisions for MU-MIMO transmissions. The logic in most cases will be hosted by the transmitting network node, typically the eNodeB that will be transmitting to UEs, since then no additional communication overhead is involved between the decision making network node and the transmitting network node. However, the logic could in principle be hosted by any network node with appropriate memory and processing power. In the following, we take the example of an eNodeB adopting the roles of transmitting entity and pairing decision making entity and UEs being the receiver entities to be paired.

To decide on user pairings, the eNodeB performs a simulation which pairs two or more UEs based on the PMIs for the UEs that have been recommended for them (typically by the UEs themselves). The simulation takes account of at least one parameter specific to the nature of the subarray virtualization of the transmitting antenna array. An included parameter might explicitly relate to the subarray, for example relate to some aspect of the signal mapping to each antenna in a subarray, such as the phase difference or differences between the individual antennas of the subarray. An included parameter might only implicitly relate to the subarray. An example of such a parameter would be the separation between the subarrays $d\lambda$. The simulation also includes auxiliary information about the propagation channels of the UEs that enable the simulation to resolve any directional ambiguities caused by the presence of the subarrays.

When the transmitter employs antenna arrays consisting of subarrays, the received signal for a UE may be described as $$r = HWs + e = FG_{virt}Ws + e,$$

where H denotes the size $N_{RX} \times N_{ports}$ effective channel matrix describing the channel between the eNodeBs subarrays (the antenna ports) and the UEs receive antennas. Utilizing information about the antenna array, the effective channel may be factorized into the product of a size $N_{RX} \times N_{TX}$ channel matrix F, describing the channel between the eNodeBs antenna elements and the UEs receive antennas, and the size $N_{TX} \times N_{ports}$ virtualization matrix $G_{virt}$ describing the subarray virtualization.

The size $N_{ports} \times N_{streams}$ precoder matrix W describes the precoding applied to the antenna ports (i.e. the subarrays). Thus, the PMI reported by the UE will indicate a precoding applied to the subarrays and not to the physical antenna subelements.

The method not only uses these reported PMIs as input to the co-scheduling simulation, but also the subarray virtualization $G_{virt}$. By this approach, the estimate of the radiation pattern of the antenna array can be expected to be more accurate. When doing this, however, one is in essence trying to estimate the larger dimension channel matrix F from the smaller dimension precoder matrix W. In other words, one is trying to reverse the mapping corresponding to the multiplication of the virtualization matrix $G_{virt}$. However, since this mapping is not invertible (since $N_{ports} < N_{TX}$), some information is lost and there is an ambiguity in the result, which manifests itself as the multiple grating lobes. Thus, some auxiliary information is needed to resolve the ambiguities, i.e. to establish which of the grating lobe directions the UE is located in.

We now describe possible methods for deriving the auxiliary information needed to resolve the above-mentioned ambiguities.

Fortunately, only coarse directional information is usually needed to resolve the discussed ambiguities, since the grating lobe positions will most often be relatively far apart. (This is expected to be the case unless the subarray size is very large.) There are several alternative methods which are suitable for deriving the needed auxiliary information. A non-exhaustive list of examples is now given.

1. Utilizing measurements from other carriers: For instance, the UE may be configured with multiple component carriers in a carrier aggregation manner and/or the uplink UL and downlink DL may be configured on different carriers and/or the UE may be connected to several RATs, where each RAT is on a separate carrier. Due to the different carrier frequencies, the antenna separation expressed in carrier wavelengths will be different for different carriers, which results in different grating (i.e. side) lobe positions and the same main (i.e. zeroth order) lobe position. The true position of the main lobe may thus be estimated by merging measurements from different carriers.

For example, a covariance matrix $R_i$ of the signals transmitted on each carrier 'i' may be estimated. For each carrier, the angle power spectrum $$P_i(\theta) = \alpha_{N_{ports},\lambda_i}(\theta)^H R_i \alpha_{N_{ports},\lambda_i}(\theta)$$

may be calculated, where $$\alpha_{N_{ports},\lambda_i}(\theta) = \begin{bmatrix} e^{j2\pi d_{\lambda_i,sub} \cdot 0 \cdot \cos(\theta)} \\ e^{j2\pi d_{\lambda_i,sub} \cdot 1 \cdot \cos(\theta)} \\ \vdots \\ e^{j2\pi d_{\lambda_i,sub} \cdot (N_{ports}-1) \cdot \cos(\theta)} \end{bmatrix}$$

and $\lambda$ is the wavelength of the carrier. For each carrier i a set of angles $\theta_{1,i}, \theta_{2,i}, \ldots$ may be identified by identifying peaks in the angle spectrum $P_i(\theta)$, i.e. the positions of the grating lobes. The grating lobe which corresponds to the actual direction of the UEs channel (i.e. the main lobe) will be estimated to be at the same angle for all carriers, while the other grating lobes will be estimated as having different angles on different carriers due to the fact that the antenna port spacing in wavelengths $d_{\lambda,sub}$ will be different on the different carriers owing to the fact the absolute spacing of the antennas is fixed, but the different carriers operate at different wavelengths. The true position of the main lobe can thus be estimated by comparing the estimated grating lobe positions across carriers. An ambiguity resolution method of this type is described in WO 2007/023371 A1.

2. Utilizing UL Measurements: In the case where more RX branches than TX branches are available, so that the RX branches have access to each physical antenna element rather than each subarray, the ambiguities may directly be resolved using an UL measurement of traffic sent to the transmitter from the receivers.

3. Utilizing multiple PMI reports by the UE: For instance, a UE may be configured to report the two or three strongest PMIs. If the UE is in a direction where the subarray radiation pattern is rather constant, the strongest PMIs should correspond to beams that are close to each other. If, on the other hand, the UE is in a direction where the subarray radiation pattern changes rapidly, the second strongest PMI may not be adjacent to the strongest PMI. This may give an indication to which grating lobe position the UE is located in.

4. Comparing CQI values: The eNodeB may trigger the UE to report the CQI value corresponding to the PMI adjacent to the strongest PMI, and compare the CQI values of the strongest and adjacent PMIs. If the difference is significant, the UE may be in a direction were the subarray radiation pattern changes rapidly.

5. Utilizing positioning information: Geographical position information could be obtained from GPS data, for example, for the receivers and optionally also the transmitter.

6. Utilizing prior information about the Antenna Array Deployment: For instance, if the transmitter antenna array of the eNodeB is installed on a rooftop, it is unlikely that a UEs propagation channel would be strong in directions pointing upwards towards the sky. Thus, those grating lobe candidates may be dismissed.

7. Utilizing measurements from co-located antennas on the same site: An example of co-located antennas is antennas corresponding to different sectors in a 3-sector site deployment. Given some information about the antenna deployment, measurements from co-located antennas may give a rough estimate about the direction of the UEs propagation channel.

Further details of the example embodiment are now described.

In order to evaluate a potential co-scheduling between two UEs, denoted UE_A and UE_B, one needs to estimate the interference that UE_A's transmission will induce for UE_B and vice versa.

This interference may be calculated as $|H_B W_A|^2$, where $H_B$ is the (unknown) channel for UE_B and $W_A$ is the (known reported) precoder for UE_A. Thus, the problem may be reduced to estimating the channel $H_B$.

The channel estimate $\widehat{H_B}$ is assumed to have the structure $\widehat{H_B} = F_B G_{virt}$ where $G_{virt}$ is the known subarray virtualization matrix and $F_B$ is the unknown channel between the eNodeB's transmitter antenna subelements and UE_B's receiver antennas. The target is then to estimate the $N_{RX} \times N_{TX}$ sized channel matrix $F_B$ from UE_B's $N_{ports} \times N_{streams}$ sized reported precoder matrix $W_B$, where $N_{RX}$ is the number of receiver antennas and $N_{streams}$ is the rank of the reported precoder matrix.

As the spacing between subarrays of the transmitter array, $d_{\lambda,sub}$, is assumed to be known, one can identify the candidate grating lobe positions as set of candidate steering angles $\theta_1, \theta_2, \ldots$ by identifying the peaks in the function $$f(\theta) = |\alpha_{N_{ports}}(\theta)^T W_B|^2,$$

where $$\alpha_{N_{ports}}(\theta) = \begin{bmatrix} e^{j2\pi d_{\lambda,sub} \cdot 0 \cdot \cos(\theta)} \\ e^{j2\pi d_{\lambda,sub} \cdot 1 \cdot \cos(\theta)} \\ \vdots \\ e^{j2\pi d_{\lambda,sub} \cdot (N_{ports}-1) \cdot \cos(\theta)} \end{bmatrix}$$

where $\alpha_{N_{ports}}(\theta)$ is a steering vector of length $N_{ports}$.

With the assistance of the above-mentioned auxiliary information, the eNodeB is able to identify which one of the set of candidate steering angles $\theta_1, \theta_2, \ldots$ is likely to correspond to the actual steering angle of the UEs propagation channel, i.e. $\theta_B$.

The eNodeB correspondingly sets $F_B = \alpha_{N_{TX}}(\theta_B)^T$, where $$\alpha_{N_{TX}}(\theta) = \begin{bmatrix} e^{j2\pi d_{\lambda} \cdot 0 \cdot \cos(\theta)} \\ e^{j2\pi d_{\lambda} \cdot 1 \cdot \cos(\theta)} \\ \vdots \\ e^{j2\pi d_{\lambda} \cdot (N_{TX}-1) \cdot \cos(\theta)} \end{bmatrix}$$

where $\alpha_{N_{TX}}(\theta)$ is a steering vector of length $N_{TX}$ and $d_\lambda$ is the antenna spacing between antenna subelements which is also assumed to be known. The channel estimate is then set to $\widehat{H_B} = F_B G_{virt} = \alpha_{N_{TX}}(\theta_B)^T G_{virt}$ and the estimation of the interference for UE_A when using this precoder is completed.

There can then follow further simulations of the radiation patterns with other pairing permutations, either to find the best combination or until a combination is found that performs adequately according to a specification, for example one that exceeds an interference value threshold for all users. Each combination can be assessed by evaluating a corresponding quantity $|H_B W_C|^2$ for each combination.

In an alternative embodiment, the eNodeB compensates for a possible angular spread in the channel by setting the channel estimate as a sum of steering vectors $$F_B = \frac{1}{\sqrt{2M+1}} \sum_{i=-M}^{M} a_{N_{TX}} (\theta_B + \Delta\theta \cdot i)^T$$

for some value of M and $\Delta\theta$.

Further, the eNodeB may perform an amplitude normalization of the estimated channel matrix $\widehat{H_B}$ so that it corresponds to the reported CQI of UE_B, assuming some noise level that may either be a de-fault noise level or a noise level derived from RSRP measurements of CSI-IM by the UE. By having obtained a better channel estimate $\widehat{H_B}$, the estimated interference $|\widehat{H_B} W_A|^2$ will be more precise, and thus, the link adaptation is improved.

Figure 2A:
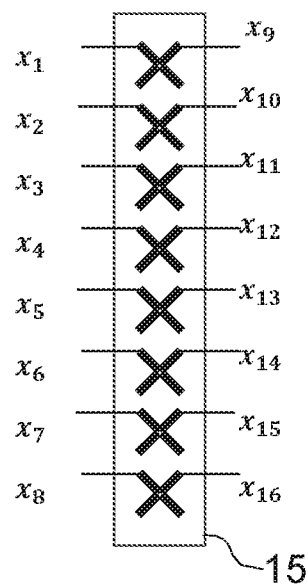
FIG. 2A shows an antenna array where each antenna subelement is fed a separate signal, i.e. subarrays are not employed.
Figure 2B:
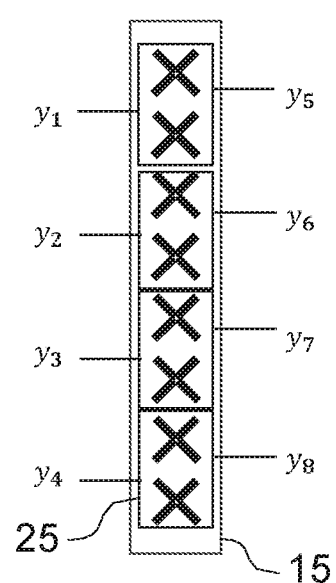
FIG. 2B shows an antenna array with subarrays, where each subarray is fed a separate signal and each antenna subelement within the same subarray is fed the same signal.
Figure 3:
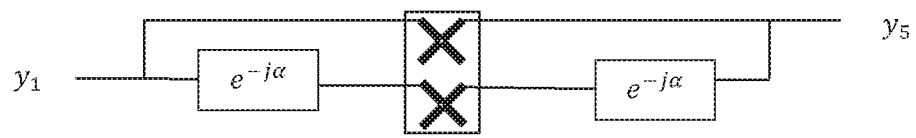
FIG. 3 is an example of signal mapping to a subarray. A phase shift is applied to the lower antenna element for each polarization.
Figure 9:
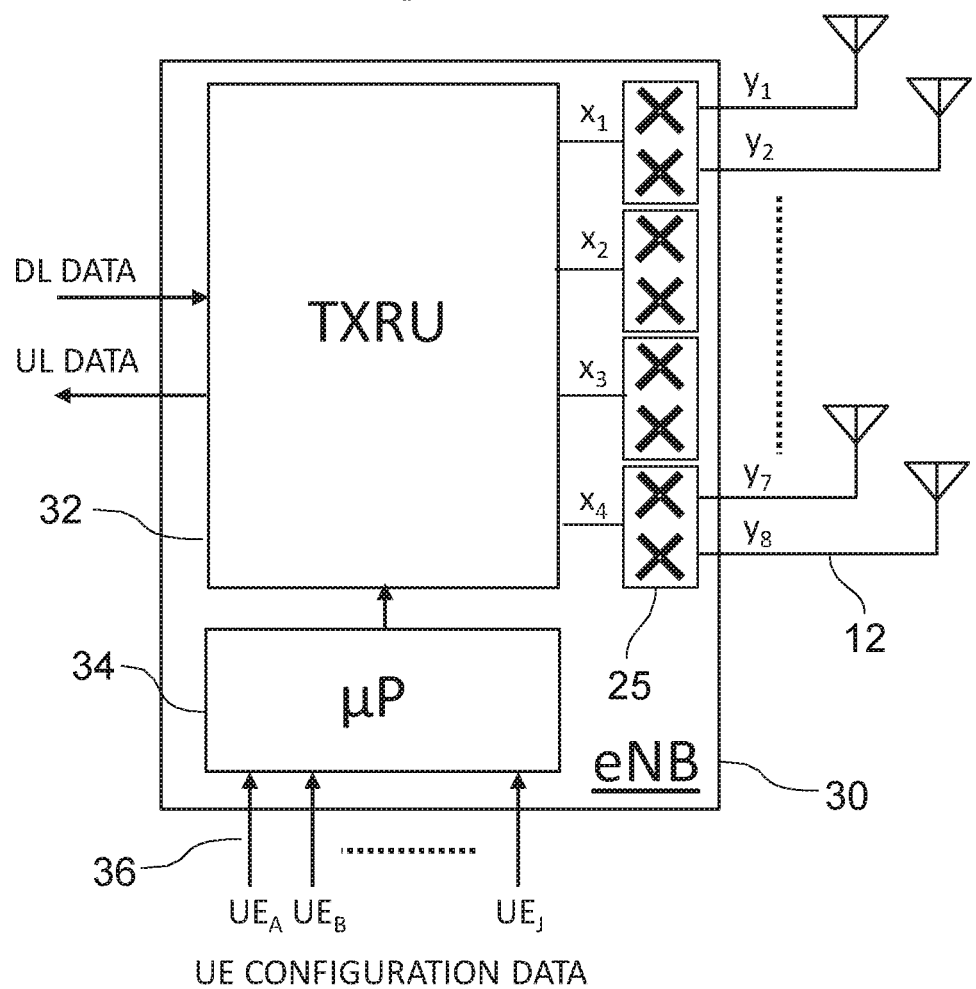
FIG. 9 is a block schematic diagram of an eNodeB according to an embodiment described in the present disclosure.

FIG. 9 is a block schematic diagram of an eNodeB 30 embodying the present disclosure. The eNB 30 is described in the following only in relation to DL data transmission although it will be understood that the eNB also handles UL data transmission. DL data is processed in a TXRU 32 for MU-MIMO in large part conventionally insofar as serial-to-parallel conversion, precoding and IFFT are concerned, i.e. as described in relation to FIG. 1. By way of example, the same subarray antenna structure as FIG. 2B is illustrated, i.e. each of the four subarrays 25 has one pair of antennas 12. As in the description of FIG. 2B, x denotes the 4 signals mapped to the antenna subelements and y the 8 signals mapped to the 8 antenna subarrays.

The precoder matrix selection performed by the eNodeB 30 is however not standard, but specific to the present disclosure, i.e. embodies the present disclosure. A processor 34 receives via an input 36 configuration data from the a plurality of UEs (i.e. UE_A, UE_B . . . UE_J) with which the eNodeB 30 is communicating, and uses this configuration data to select a precoder matrix that is suited to the MU-MIMO communication taking account of the fact that the antennas are arranged in subarrays. This is now described further with reference also to the specific design of the UEs.

Figure 10:
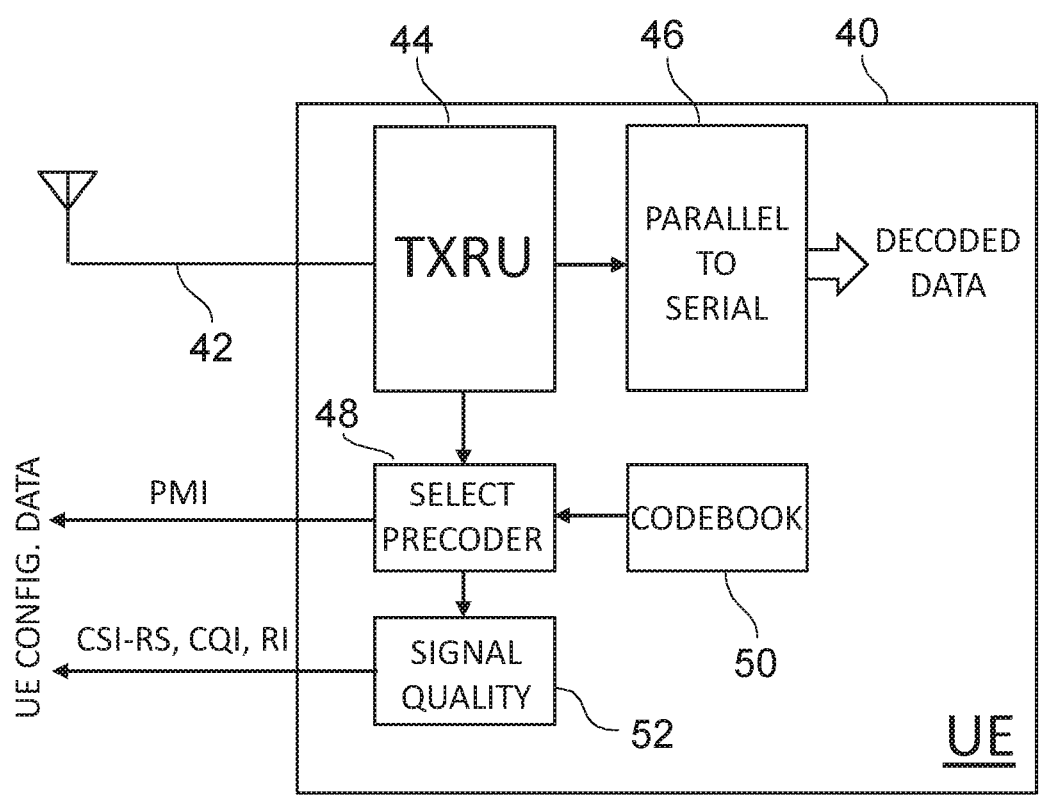
FIG. 10 is a block schematic diagram of a UE for use with the eNodeB of FIG. 9.

FIG. 10 is a block schematic diagram of a UE 40 for use with the eNodeB 30 of FIG. 9. It will be understood that typically the eNodeB will be communicating with multiple UEs, which may each have the design shown. The UE is assumed to be the most downstream of the communicating network entities. The UE has an antenna 42 arranged to receive the MU-MIMO signal bearing the, for example OFDM, encoded data from the eNodeB 30 and decodes it with the receiver part of a TXRU 44 and subsequent parallel-to-serial converter 46, whereupon the decoded data may be used by the UE.

For feedback to the eNodeB 30, the UE 40 also includes a precoder selector 48 which selects what it decides would be a suitable precoder matrix, based on the signal received by the TXRU from the eNodeB. The selection is done with reference to a codebook 50 containing a set of predetermined precoding matrix candidates. In some cases a single suitable precoder matrix is selected, e.g. the one deemed to be most suitable. In other cases, several suitable precoder matrices may be selected, if multiple suitable ones are found. It is noted that this selection may be based on a RS element of the transmitted data, or on arbitrary data being transmitted. The selected precoder information is referred to as the precoder matrix indicator (PMI), as already mentioned, and is transmitted upstream to the eNodeB as feedback. Of relevance to the present disclosure is to note that the PMI from the UE does not take account of the fact that the eNodeB antennas are arranged in subarrays. A UE may supply one recommendation of precoder matrix or multiple recommendations of potentially suitable precoders.

Like the PMI, the UE also makes a quality analysis of the received signal in a signal quality unit 52 and determines several quality parameters which are also fed back to the transmitting eNodeB. The quality information may include CQI and/or CSI. CSI may include CSI-IM and/or CSI-RS. RI data may also be fed back.

The data fed back to the eNodeB to assist its transmission configuration is collectively referred to as UE configuration data. It will be understood that each UE will be sending its own data back to the eNodeB, so the eNodeB will have J sets of configuration data, one for each of UE_A, . . . UE_J, to which it is transmitting through the antenna array. It is noted that, although the illustrated UE has only one antenna, the present disclosure is also applicable in the case that UEs each have multiple antennas.

Figure 11:
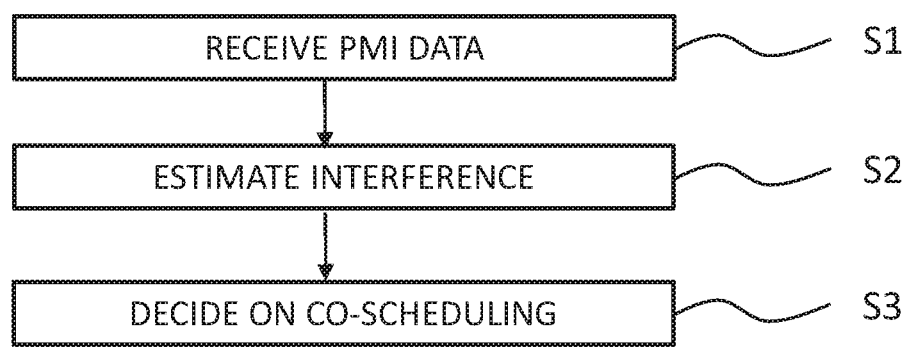
FIG. 11 is a flow diagram showing a method carried out by the decision making unit in the eNodeB of FIG. 9.

FIG. 11 is a flow diagram showing a method carried out by the decision making unit in the eNodeB of FIG. 9.

In Step S1, candidate PMIs are received from the UE receivers 40 as part of the UE configuration data.

In Step S2, the decision making unit 34 of the eNB 30 calculates interference estimates of interference caused by the various antenna combinations, i.e. the permutations of the transmission signals to one receiver antenna on the transmission signal(s) to the other receiver antenna(s). The estimate calculations are carried out using the candidate PMIs and at least one parameter specific to the antenna subarrays of the transmitting antenna array. Possible parameters include those which relate to signal mapping that transforms the signal for each subarray into the individual signals for each antenna in a given subarray, e.g. the phase difference between the signals sent to the individual antennas. Another suitable parameter is separation distance between subarrays.

In Step S3, a decision is made on a suitable co-scheduling combination. The combination will be one that is predicted by the estimation calculations to provide an adequately low interference. This decision can then be transmitted to the TXRU 32 and implemented.

The method illustrated in FIG. 11 may comprise one of more further steps as generally described herein.

Figure 12:
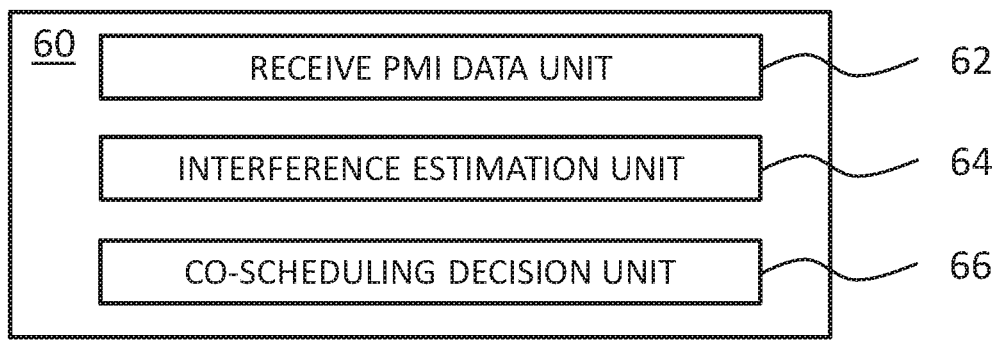
FIG. 12 is a block schematic diagram showing a decision making unit in the eNodeB of FIG. 9.

FIG. 12 is a block schematic diagram showing a decision making unit 60 in the processor 34 of the eNodeB 30 of FIG. 9. This is the unit which processes the UE configuration data to decide which precoder matrices to use.

A receive PMI data unit 62 receives from the UEs the candidate precoder matrix indicators which are to receive respective transmission signals. An interference estimation unit 64 calculates an estimate of interference caused by the transmission signal to one receiver antenna on the transmission signal(s) to the other receiver antenna(s) based on at least one parameter specific to the antenna subarrays of the transmitting antenna array, which may include some of the quality related UE configuration data CSI, CQI etc, but need not. For example, one relevant parameter is the spatial separation between adjacent antenna subarrays $d_\lambda$. A co-scheduling decision unit 66 decides upon a co-scheduling combination which is predicted to provide an adequately low interference based on the interference estimates. The selected co-scheduling combination for each of the subarrays is then transmitted from the eNodeB processor to the eNodeB TXRU and implemented for subsequent transmission.

Here, for the avoidance of doubt, it is noted that the references to interference in relation to the activities in the eNodeB for selecting suitable precoder matrices is to simulated interference based on the calculated radiation patterns (e.g., by simulating a superposition of two or more electromagnetic waves with a known relative phase), not to any signal quality parameters fed back as the UE configuration data.

Figure 13:
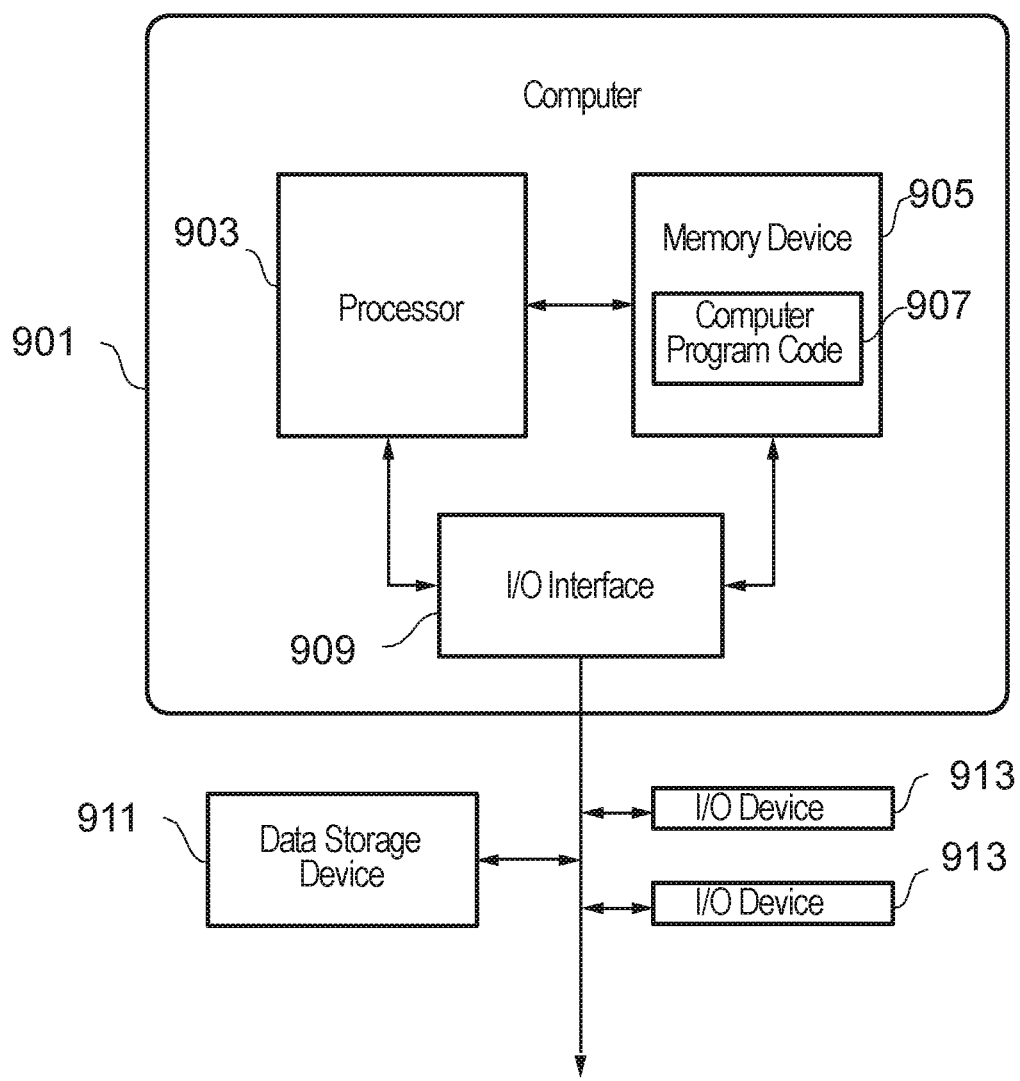
FIG. 13 shows a computer and computer program code that may be used to implement a method according to any of the embodiments described in the present disclosure.

FIG. 13 shows a structure of a computer (implemented, e.g., as a server or a virtualized computing system, possibly a distributed computing system) and computer program code that may be used to implement any of the above-described methods and may be incorporated in any of the above-described components for determining co-scheduling. Specifically, such a computer as shown may be configured to implement the above described method of co-scheduling, for example as part of, or the whole of, an eNB or other network entity.

In FIG. 13, computer system 701 comprises a processor 703 coupled through one or more I/O inter-faces 709 to one or more hardware data storage devices 711 and one or more I/O devices 713 and 715. Processor 703 may also be connected to one or more memory devices or memories 705. At least one memory device 705 contains stored computer program code 707, which is a computer program that comprises computer-executable instructions. The stored computer program code includes a program that implements the method and method aspects presented herein. The data storage devices 711 may store the computer program code 707. Computer program code 707 stored in the storage devices 711 is configured to be executed by processor 703 via the memory devices 705. Processor 703 executes the stored computer program code 707.

Memory 705 may comprise any known computer-readable storage medium, which is described below. In one implementation, cache memory elements of memory 705 provide temporary storage of at least some program code (e.g., program code 707) in order to reduce the number of times code needs to be retrieved from bulk storage while instructions of the program code are carried out. Moreover, similar to CPU 703, memory 705 may reside at a single physical location, comprising one or more types of data storage, or be distributed across a plurality of physical systems in various forms.

I/O interface 709 comprises any system for exchanging incoming or outgoing information with an external source. I/O devices 713, 715 comprise any known type of external device, including a display device (e.g., monitor), keyboard, etc. A bus provides a communication link between each of the components in computer system 701, and may comprise any type of transmission link, including electrical, optical, wireless, etc.

I/O interface 709 also allows computer system 701 to store information (e.g., data or program instructions such as program code 707) on and retrieve the information from computer data storage unit 711 or another computer data storage unit (not shown). Computer data storage unit 711 may comprise any known computer-readable storage medium. For example, computer data storage unit 711 may be a non-volatile data storage device, such as a semiconductor memory, a magnetic disk drive (i.e., hard disk drive) or an optical disc drive (e.g., a CD-ROM drive which receives a CD-ROM disk).

An implementation of the present disclosure may take the form of a computer program product embodied in one or more computer-readable storage medium(s) (e.g., memory 705 and/or computer data storage unit 711) having computer-readable program code (e.g., program code 707) embodied or stored thereon. Program code (e.g., program code 707) embodied on a computer-readable medium may be transmitted using any appropriate medium, including but not limited to wireless, wireline, optical fiber cable, radio frequency (RF), etc., or any suitable combination of the foregoing.

In summary, there has been described a method which can be performed by a transmitting network node, such as an eNodeB, in which an evaluation of a MU-MIMO co-scheduling hypothesis of two or more UEs is performed by utilizing the reported precoder matrix indices, PMIs, of the two or more UEs. The evaluation uses information about the transmitting antenna array, such as the subarray virtualization $G_{virt}$ and the antenna element separation $d_\lambda$, and also, if needed, auxiliary information about the two or more UEs propagation channels enabling the eNodeB to resolve any directional ambiguities that may arise in view of the antenna element separation $d_\lambda$.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A method for a network entity to make decisions on co-scheduling of receivers in a multi-user, multiple-input multiple-output communication system, which comprises a transmitter and multiple receivers, the transmitter being provided with an antenna array made up of multiple antenna subarrays, each having a plurality of antenna subelements, the method comprising:
   receiving candidate precoder matrix indicators for each of the receivers which are to receive respective transmission signals;
   calculating at least one interference estimate of interference caused by a first transmission signal to a first receiver on at least a second transmission signal to at least a second receiver using the candidate precoder matrices specified in the precoder matrix indicators and at least one parameter specific to the antenna subarrays of the transmitting antenna array, the at least one parameter including a parameter which relates to a signal mapping used to transform a signal inputted to each antenna subarray into signals for each antenna subelement in that antenna subarray;
   deciding on a co-scheduling combination between at least two receivers based on the at least one interference estimate; and
   transmitting using the decided upon co-scheduling combination.

2. The method of claim 1, wherein the signal mapping is a linear function.

3. The method of claim 2, wherein the linear function applies phase shifts to the signal inputted to the subarray, so that each antenna subelement receives a differently phase-shifted version of the inputted signal.

4. The method of claim 3, wherein the at least one parameter includes a parameter which relates to the phase shifts.

5. The method of claim 1, wherein the subarrays are separated from each other by a distance, and wherein the at least one parameter includes a parameter which is this separation distance.

6. The method of claim 1, further comprising, as a prompt to receive the candidate precoder matrix indicators:
   transmitting respective reference signals to the receivers, each having a phase center separation greater than half a wavelength, the received candidate precoder matrix indicators then being determined based on these reference signals.

7. The method of claim 1, wherein the candidate precoder matrix indicators are received from network entities hosting the respective receivers.

8. The method of claim 1, wherein, in cases where the calculation of interference estimates results in multiple possible candidate transmission directions, the estimate calculation is extended to further include:
   determining which of the candidate transmission directions is the one most likely to provide a lower interference.

9. The method of claim 8, wherein said determining is performed by at least one of the following:
   using a measurement of another carrier which is available for communication between the transmitter and the receivers;
   using an uplink measurement of traffic sent to the transmitter from the receivers;

in the case that at least some of the receivers each send multiple candidate precoder matrix indicators, comparing strength of the multiple candidate precoder matrix indicators;

comparing channel quality indicator values for the precoder matrix indicator of highest strength and next highest strength;

using geographical position information of at least one of: the transmitter and the receivers;

using known information relating to transmitter antenna array deployment; and using measurements from other antennas located adjacent to the transmitter antenna array.

10. A transmission method for a multi-user, multiple-input multiple-output communication system, which comprises a transmitter and multiple receivers, the transmitter being provided with an antenna array made up of multiple antenna subarrays, each having a plurality of antenna subelements, the method comprising:

receiving candidate precoder matrix indicators for each of the receivers which are to receive respective transmission signals;

calculating at least one interference estimate of interference caused by a first transmission signal to a first receiver on at least a second transmission signal to at least a second receiver using the candidate precoder matrices specified in the precoder matrix indicators and at least one parameter specific to the antenna subarrays of the transmitting antenna array, the at least one parameter including a parameter which relates to a signal mapping used to transform a signal inputted to each antenna subarray into signals for each antenna subelement in that antenna subarray;

deciding on a co-scheduling combination between at least two receivers based on the at least one interference estimate; and carrying out a transmission with the co-scheduling combination.

11. A non-transitory computer-readable medium storing a computer program that, when executed by a processor of a network entity, performs a method for the network entity to make decisions on co-scheduling of receivers in a multi-user, multiple-input multiple-output communication system, which comprises a transmitter and multiple receivers, the transmitter being provided with an antenna array made up of multiple antenna subarrays, each having a plurality of antenna subelements, the method comprising:

receiving candidate precoder matrix indicators for each of the receivers which are to receive respective transmission signals;

calculating at least one interference estimate of interference caused by a first transmission signal to a first receiver on at least a second transmission signal to at least a second receiver using the candidate precoder matrices specified in the precoder matrix indicators and at least one parameter specific to the antenna subarrays of the transmitting antenna array, the at least one parameter including a parameter which relates to a signal mapping used to transform a signal inputted to each antenna subarray into signals for each antenna subelement in that antenna subarray;

deciding on a co-scheduling combination between at least two receivers based on the interference estimates; and transmitting using the decided upon co-scheduling combination.

12. A network entity responsible for making decisions on co-scheduling receivers in a multi-user, multiple-input multiple-output communication system, which comprises a transmitter and multiple receivers, the transmitter being provided with an antenna array made up of multiple antenna subarrays, each having a plurality of antenna subelements, the network entity comprising:

an input configured to receive candidate precoder matrix indicators for each of the receivers which are to receive respective transmission signals; and a processor configured calculate at least one interference estimate of interference caused by a first transmission signal to a first receiver on at least a second transmission signal to at least a second receiver using the candidate precoder matrices specified in the precoder matrix indicators and at least one parameter specific to the antenna subarrays of the transmitting antenna array, the at least one parameter including a parameter which relates to a signal mapping used to transform a signal inputted to each antenna subarray into signals for each antenna subelement in that antenna subarray;

decide on a co-scheduling combination between at least two receivers based on the interference estimates; and transmit using the decided upon co-scheduling combination.

13. The network entity of claim 12, wherein the signal mapping is a linear function.

14. The network entity of claim 13, wherein the linear function is configured to apply phase shifts to the signal inputted to the subarray, so that each antenna subelement receives a differently phase-shifted version of the inputted signal.

15. The network entity of claim 14, wherein the at least one parameter includes a parameter which relates to the phase shifts.

16. The network entity of claim 12, wherein the subarrays are separated from each other by a distance, and wherein the at least one parameter includes a parameter which is this separation distance.

17. The network entity of claim 12, wherein the processor is configured to supply respective reference signals to be transmitted to the receivers, each having a phase center separation greater than half a wavelength, so that the candidate precoder matrix indicators received by the input are determined based on these reference signals.

18. The network entity of claim 12, wherein the input is configured to receive the candidate precoder matrix indicators from network entities hosting the respective receivers.

19. The network entity of claim 12, wherein, in cases where the calculation of interference estimates results in multiple possible candidate transmission directions, the processor is configured to extend the estimate calculation to further include:

determining which of the candidate transmission directions is the one most likely to provide a lower interference.

20. The network entity of claim 19, wherein the processor is configured to perform said determining by at least one of the following:

using a measurement of another carrier which is available for communication between the transmitter and the receivers;

using an uplink measurement of traffic sent to the transmitter from the receivers;

in the case that at least some of the receivers each send multiple candidate precoder matrix indicators, comparing strength of the multiple candidate precoder matrix indicators;

comparing channel quality indicator values for the precoder matrix indicator of highest strength and next highest strength;
using geographical position information of at least one of: the transmitter and the receivers;
using known information relating to transmitter antenna array deployment; and
using measurements from other antennas located adjacent to the transmitter antenna array.

21. The network entity of claim 12, wherein the network entity is an evolved node B.

* * * * *